United States Patent
Zeinar et al.

(10) Patent No.: US 9,016,723 B2
(45) Date of Patent: Apr. 28, 2015

(54) STEERING WHEEL ARRANGEMENT FOR A MOTOR VEHICLE

(75) Inventors: Peter Zeinar, Ingolstadt (DE); Immo Redeker, Munich (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/342,075

(22) PCT Filed: Jul. 27, 2012

(86) PCT No.: PCT/EP2012/003206
§ 371 (c)(1),
(2), (4) Date: Feb. 28, 2014

(87) PCT Pub. No.: WO2013/029729
PCT Pub. Date: Mar. 7, 2013

(65) Prior Publication Data
US 2014/0217691 A1 Aug. 7, 2014

(30) Foreign Application Priority Data
Sep. 1, 2011 (DE) .......................... 10 2011 112 079

(51) Int. Cl.
B62D 1/16 (2006.01)
B62D 1/04 (2006.01)
B62D 1/20 (2006.01)
B62D 15/02 (2006.01)

(52) U.S. Cl.
CPC .. B62D 1/04 (2013.01); B62D 1/16 (2013.01); B62D 1/20 (2013.01); B62D 15/02 (2013.01)

(58) Field of Classification Search
USPC .................................... 280/779; 74/492, 493
See application file for complete search history.

(56) References Cited

U.S. PATENT DOCUMENTS

| 2010/0019480 A1* | 1/2010 | Domin et al. ................. 280/780 |
| 2011/0041643 A1* | 2/2011 | Watanabe ....................... 74/493 |
| 2013/0160595 A1* | 6/2013 | Moriyama et al. ............. 74/493 |

FOREIGN PATENT DOCUMENTS

| DE | 3801485 | 6/1989 |
| DE | 102004008087 | 9/2005 |
| EP | 0188164 | 7/1986 |
| EP | 1082230 | 3/2001 |
| EP | 1719689 | 11/2006 |
| EP | 1783004 | 5/2007 |
| JP | 56-75030 | 6/1981 |
| WO | 2007/076830 | 7/2007 |
| WO | 2009/083079 | 7/2009 |

OTHER PUBLICATIONS

English Language International Search Report for PCT/EP2012/003206, mailed Nov. 2, 2012, 2 pages.
WIPO English Language Translation of International Preliminary Report on Patentability for PCT/EP2012/003206, downloaded from WIPO Website Apr. 8, 2014, 5 pages.

* cited by examiner

Primary Examiner — Toan To
(74) Attorney, Agent, or Firm — Staas & Halsey LLP

(57) ABSTRACT

A steering wheel arrangement for a motor vehicle has a steering wheel which is coupled in terms of movement to a steerable axle of the motor vehicle via a steering axle. The steering wheel is arranged rotatably on a steering column having a housing body. The housing body has at least one upwardly open recess which is bounded at least by two opposite walls extending transversely with respect to the longitudinal center axis of the housing body.

13 Claims, 3 Drawing Sheets

STEERING WHEEL ARRANGEMENT FOR A MOTOR VEHICLE

CROSS REFERENCE TO RELATED APPLICATIONS

This application is based on and hereby claims priority to International Application No. PCT/EP2012/003206 filed on Jul. 27, 2012 and German Application No. 10 2011 112 079.7 filed on Sep. 1, 2011, the contents of which are hereby incorporated by reference.

BACKGROUND

The invention relates to a steering wheel device for a motor vehicle, comprising a steering wheel, which is motionally coupled to a steerable axle of the motor vehicle by a steering shaft, which steering wheel is arranged rotatably on a steering column having a housing body.

Steering wheel arrangements of this kind are known per se. The basic function of relevant steering wheel arrangements is to transmit rotary movements or actuations of the steering wheel to a steerable axle of the motor vehicle, thus allowing the motor vehicle to be steered. The significant constituents of a steering wheel arrangement are a steering shaft, which is connected to a steerable axle of the motor vehicle and at least a section of which is usually arranged in a steering column, and a steering wheel, which is arranged on the steering column and is motionally coupled to the steering shaft and furthermore to the steerable axle of the motor vehicle.

The steering wheel arrangements known from the related art generally take up part of the installation space available, which, as is known, is limited within motor vehicles. This is due, in particular, to the design configuration of corresponding steering columns or of the housing bodies forming the latter, which are designed as continuous cuboidal bodies, for example. In particular, the installation space taken up by the steering columns cannot be used in other ways, that is to say, for instance, for the arrangement of indicating means or the like.

SUMMARY

One potential problem is specifying a steering wheel arrangement which is improved in terms of advantageous use of installation space.

The inventors propose a steering wheel arrangement of the type stated at the outset which is distinguished by the fact that at least one upwardly open recess, which is bounded at least by two opposite walls extending transversely to the longitudinal center axis of the housing body, is formed in the housing body.

In comparison with known steering wheel arrangements, the proposed steering wheel allows better use of installation space, this being achieved substantially by the fact that the steering column belonging to the steering wheel arrangement or the housing body forming said steering column is provided with at least one recess, which recess allows advantages in terms of the use of installation space within the motor vehicle, these advantages being stated below.

The longitudinal center axis of the housing body of the steering column is intended to mean the imaginary extension of the steering shaft in the axial direction or longitudinal direction.

In the direction of the longitudinal center axis of the housing body, the recess is bounded by two opposite walls extending transversely to the longitudinal center axis of the housing body. A direction of extent transverse to the longitudinal center axis of the housing body is not intended to mean only relevant walls actually extending at right angles to the longitudinal center axis of the housing body; on the contrary, the walls can also extend obliquely to the longitudinal center axis of the housing body, in relation to a vertical plane, with the result that the longitudinal center axis of the housing body passes through the plane defined by the respective wall, not at right angles but at an oblique angle.

Of course, there is at least one further wall between the two opposite walls extending transversely to the longitudinal center axis of the housing body, said further wall establishing a connection between the two opposite walls. The plane defined by the further wall can be oriented in a vertical or a horizontal direction. The further wall can have at least one aperture, i.e. at least one opening.

The recess provided in the steering column or the housing body belonging to the latter is upwardly open. This means that the recess is opened in a radial or vertical direction relative to the longitudinal center axis of the housing body. Particularly in the state of the steering wheel arrangement in which it is installed in a motor vehicle, the recess is thus open in the direction of an axis projecting vertically upward and extending transversely to the longitudinal axis of the motor vehicle.

Fundamentally, there is a free choice of absolute dimensions, such as the height, width and depth of the recess, depending on the corresponding dimensions of the steering column or housing body. In particular, these are also dependent on the intended use of the recess. The same applies to the shape of the recess and the volume described by the recess. Typical shapes of the recesses are cuboidal or trough-shaped, for example.

The steering column belonging to the steering wheel arrangement can be of single- or multi-part design and, in the latter case, relevant parts of the steering column can be connected or are connected releasably or permanently to form a steering column. The steering column can be produced from a plastic material by an injection molding method, for example.

It is possible for the recess furthermore to be bounded by at least two side walls of the housing body which extend in the direction of the longitudinal center axis of the housing body. Consequently, the recess in this embodiment is bounded substantially by four or, if appropriate, five walls, that is to say the opposite walls extending transversely to the longitudinal center axis of the housing body and the two side walls extending in the direction of the longitudinal center axis of the housing body, which are preferably likewise arranged opposite one another, and, if appropriate, by a horizontal wall closing off the recess at the bottom to form a base. It is conceivable that at least one side wall should likewise extend obliquely at a certain angle to the longitudinal center axis, with the result that it narrows or widens the recess in the direction of the longitudinal center axis of the housing body. In other words, it is possible to give the recess a variable width, and this likewise demonstrates the versatile nature of the recess and hence also of the steering column belonging to the proposed steering wheel device in terms of design and hence of adaptability to a large number of different installation situations.

The depth of the recess preferably corresponds at least to the position of the longitudinal center axis of the housing body. It is also conceivable for the depth of the recess to go beyond the position of the longitudinal center axis of the housing body. Accordingly, the recess, which can, in particular, be designed as a receiving region for a particular object, has a sufficient depth, with the result that a corresponding object can be mounted therein in a sufficiently secure manner, i.e. is not moved out of the recess, even when there are abrupt acceleration processes by a motor vehicle. The reference point for the depth of the recess, which is intended to mean substantially the vertical extent thereof, is the position of the longitudinal center axis of the housing body, which results, in turn, from the dimensions of the housing body. In exceptional cases, the depth of the recess can also be less than the position of the longitudinal center axis of the housing body.

It is furthermore possible for the recess to be designed as a through opening and to fully penetrate the housing body. In this embodiment, the steering column is thus fully penetrated at at least one point, in particular in the vertical direction, i.e. the depth of the recess corresponds to the height of the housing body. The other dimensions and the shape of the recess designed as a through opening are freely selectable. In this embodiment, the recess is thus open both at the top and at the bottom.

It is conceivable for at least one of the walls extending transversely to the longitudinal center axis of the housing body to extend obliquely relative to a vertical plane. Consequently, an improved design configuration of the housing body both from a functional and, where applicable, production engineering point of view is obtained. Giving relevant walls extending transversely to the longitudinal axis an oblique slope can be advantageous in terms of ergonomics when it comes to integrating relevant functional, indicating or operating elements into the housing body of the steering column. An oblique slope can also allow easier removal of the housing body from an injection mold, for example, acting as a draft angle.

In principle, the oblique slope does not have to be linear, that is to say at a fixed angle or a fixed slope relative to the vertical plane. On the contrary, embodiments of relevant walls with a convex or concave curvature in the direction of the longitudinal center axis of the housing body are also conceivable. If both walls have an appropriate oblique slope, it is possible for said walls to have identical or different angles of inclination and/or curvatures.

In a preferred embodiment, at least one indicating means or part of at least one indicating means is arranged in or on that wall of the housing body which is remote from the steering wheel and extends transversely to the longitudinal center axis of the housing body. Consequently, the relevant wall of the housing body forms a bearing surface or a receiving region for an indicating means, such as a display or the like. It is also possible to integrate an indicating means into the relevant wall of the housing body, i.e. to provide the wall with an appropriate recess for at least one indicating means. This is an optimized use, in terms of installation space, of the recess of the housing body of the steering column, which accommodates at least a section of a corresponding indicating means. It is likewise a particularly ergonomic arrangement of an indicating means, since it has been found to give the driver a particularly advantageous angle of view of the indicating means. Moreover, the arrangement is advantageous in terms of the safety aspects since the driver can turn his attention particularly quickly from the current traffic situation ahead of a motor vehicle to the content shown on the indicating means and vice versa. Of course, the indicating means is arranged in an appropriate manner such that the content that can be shown thereon or on an indicating surface belonging thereto is clearly visible to the driver. If appropriate, a suitable pivoting device can be provided within the housing body of the steering column or, more generally, in a manner coupled to the indicating means, allowing the indicating means to be pivoted or tilted with various degrees of freedom (upward, downward, to the left, to the right).

It is likewise conceivable to use the additional installation space available by virtue of the recess provided in the steering column in such a way that, overall, an indicating means with a larger indicating surface can be used. Thus, on the one hand, one section of the indicating means can be arranged on the corresponding wall of the housing body of the steering column, that remote from the steering wheel and extending transversely to the longitudinal center axis, and, on the other hand, another section can be arranged in a region of a motor vehicle, in particular an instrument panel or the like. The latter embodiment thus allows, as it were, an instrument panel which is extended downward into the recess in the steering column, thus enlarging the amount of installation space available for larger or, if appropriate, additional indicating means.

It is expedient for at least one angle gear that transmits rotary movements of the steering wheel to the steering shaft to be inserted between the steering wheel and the steering shaft in the region of the steering column. The angle gear serves to transmit rotary movements of the steering wheel to the steering shaft, which transmits the rotary movements onward to the steerable axle of a motor vehicle. Gear ratios can be obtained through appropriate choice and dimensioning of the gear elements forming the angle gear. Fundamentally, this is a mechanical coupling between the steering wheel, the steering shaft and the steerable axle. It is conceivable to provide a plurality of appropriate angle gears. The angle gear can be designed as a spur gear, for example, but other designs of appropriate angle gears are also possible.

One advantageous possibility is for the angle gear to have at least two gear elements arranged adjacent to the recess in the housing body and designed, in particular, as gearwheels, which gear elements are motionally coupled to one another by at least one gear shaft connecting them. Consequently, it is possible to bypass the region of the recess by an appropriate arrangement of gear elements, i.e. to divert relevant rotary movements of the steering wheel past the recess via the angle gear within the housing body of the steering column. Thus, none of the gear elements included in the angle gear projects into the recess. Gear elements arranged in a fixed position adjacent to the side of the recess close to the steering wheel or in the region of the end of the housing body close to the steering wheel receive rotary movements of the steering wheel, transmit them, if appropriate with multiplication, to the gear shaft, which, of course, has corresponding sections that mesh with the gear elements and by which said movements are transmitted onward to gear elements arranged adjacent to the side of the recess remote from the steering wheel or in the region of the end of the housing body remote from the steering wheel, and onward to the steerable axle.

The gear shaft is preferably arranged in a hole in a side wall, laterally bounding the recess, of the housing body. This is a matter of integrating the gear shaft into the side wall, although, of course, it is ensured that the gear shaft is mounted so as to be rotatable without problems within the side wall.

As an alternative, it is possible for the motional coupling between the steering wheel and the steerable axle to be accomplished electronically by a control unit, in particular a control unit which has at least one sensor system that senses rotary movements of the steering wheel and communicates with at least one actuator designed to perform steering movements of the steerable axle.

This embodiment relates to what is known as a "steer-by-wire steering system", which is implemented substantially electronically, i.e. with control by a control unit designed for this purpose. The principle is based on detecting rotary movements of the steering wheel by a sensor system and on converting them into corresponding electronic steering signals, which steering signals are transmitted to an actuator which, on the basis of the steering signals, brings about actuation of the steerable axle of the motor vehicle and hence a steering process.

In addition, the inventors propose a motor vehicle comprising a steering wheel arrangement as described above. Fundamentally, the same statements apply to the motor vehicle as to the steering wheel arrangement.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
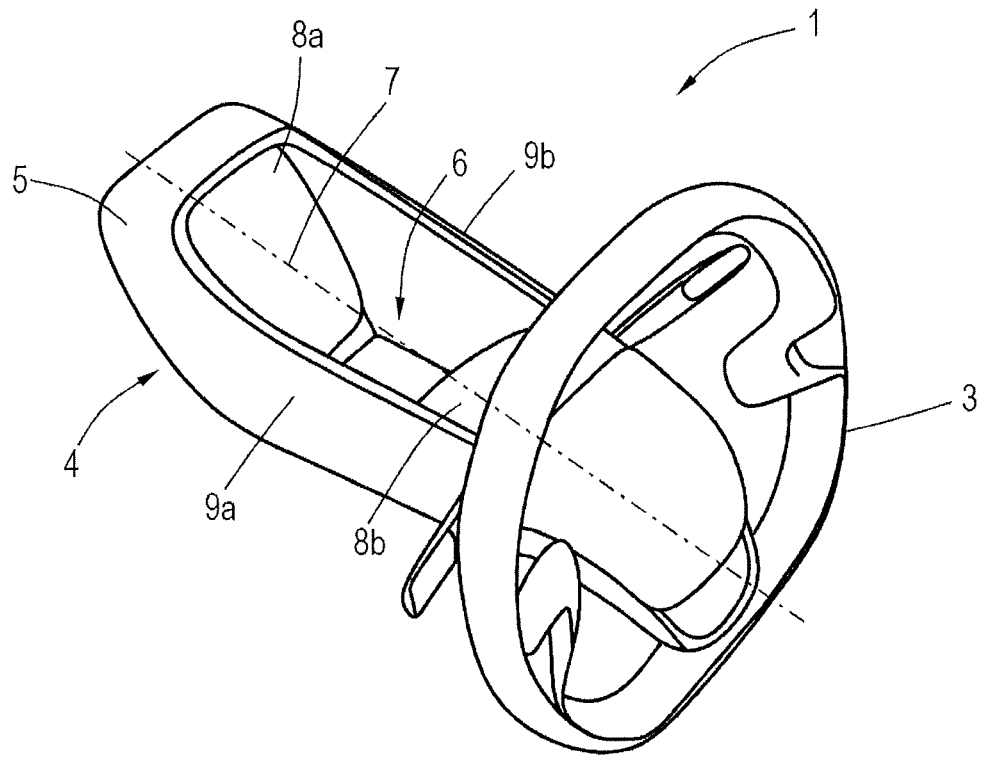
FIG. 1 shows a perspective schematic illustration of a proposed steering wheel device in accordance with an illustrative embodiment.

Reference will now be made in detail to the preferred embodiments of the present invention, examples of which are illustrated in the accompanying drawings, wherein like reference numerals refer to like elements throughout.

Figure 2:
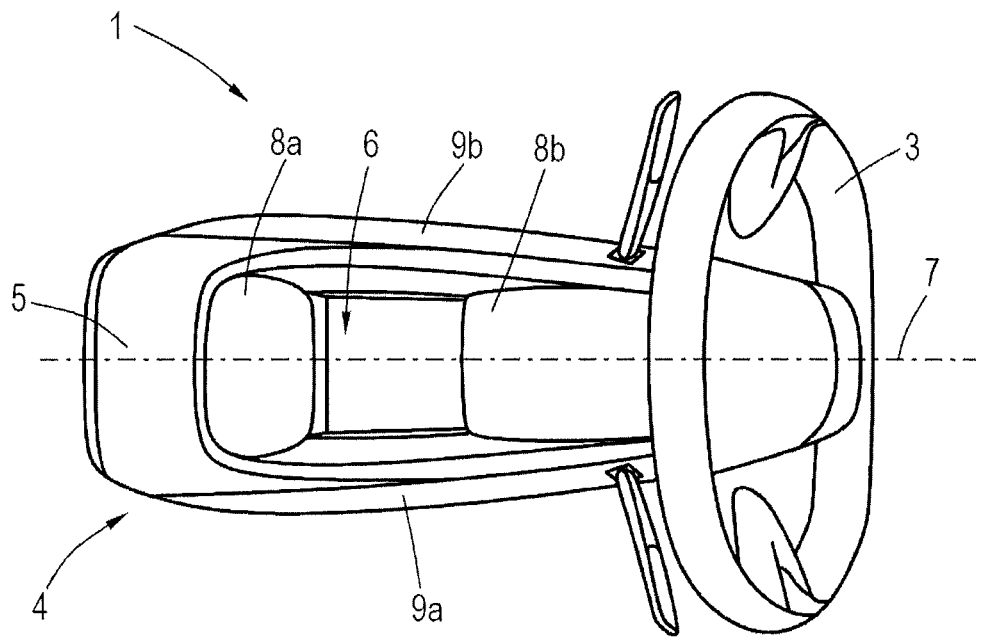
FIG. 2 shows a plan view of the steering wheel arrangement shown in FIG. 1.

FIG. 1 shows a perspective schematic illustration of a steering wheel arrangement 1 in accordance with an illustrative embodiment. FIG. 2 shows a corresponding plan view of the steering wheel arrangement 1 shown in FIG. 1. The steering wheel arrangement 1 is part of a motor vehicle (not shown) and comprises a steering wheel 3, which is motionally coupled to a steerable axle (not shown), in particular a steerable front axle, of the motor vehicle by a steering shaft 2 (cf. FIG. 5), which steering wheel 3 is arranged rotatably on a steering column 4. The steering column 4 has a housing body 5. As is apparent, further operating elements (not designated specifically), such as pivoted levers or the like, can be arranged on the housing body 5, next to the steering wheel 3.

As is apparent, the steering column 4 or the housing body 5 belonging thereto differs from conventional steering columns in having a central recess 6 formed in the housing body 5 and open upward or in the vertical direction.

The recess 6 is bounded in the direction of the longitudinal center axis 7 of the housing body 5 by two opposite walls 8a, 8b extending transversely to the longitudinal center axis 7 of the housing body 5. The longitudinal center axis 7 of the housing body 5 is intended to mean the imaginary extension of the steering shaft 2 in the axial direction or longitudinal direction. The walls 8a, 8b, which extend transversely to the longitudinal center axis 7 of the housing body 5, extend obliquely relative to a vertical plane. The walls 8a, 8b can furthermore be provided with a certain curvature, and therefore said walls can be embodied so that at least certain sections thereof extend in an arc in the direction of the longitudinal center axis 7 of the housing body 5. In a direction transverse to the longitudinal center axis 7 of the housing body 5, the recess 6 is bounded by respective side walls 9a, 9b which are arranged opposite one another and extend in the direction of the longitudinal center axis 7 of the housing body 5.

Overall, the housing body 5 of the steering column 4 is a symmetrical component with respect to a vertical plane passing centrally through said housing body in the direction of the longitudinal center axis 7. In the embodiment shown, the recess 6 or the volume corresponding thereto corresponds to a trough shape.

In principle, the depth of the recess 6 corresponds at least to the horizontal position of the longitudinal center axis 7 of the housing body 5. It is also conceivable for the depth of the recess 6 to go beyond the horizontal position of the longitudinal center axis 7 of the housing body 5. With the depth of the recess 6 in relation to the vertical dimensions of the housing body 5, a receiving and/or functional region is thus formed within the steering column 4, said region having advantages in view of the only limited amount of installation space available within motor vehicles.

In the illustrative embodiment shown in the Figures, the recess 6 is designed as a through opening or aperture, i.e. it fully penetrates the housing body 5 of the steering column 4 in the vertical direction. Consequently, the maximum depth of the recess 6 corresponds substantially to the vertical dimensions of the housing body 5 of the steering column 4.

The steering column 4 or housing body 5 can be embodied as a single- or multi-part component. This is preferably an injection molding formed from a plastic material, offering advantages both in terms of production engineering and also as regards freedom of design and construction.

Figure 3:
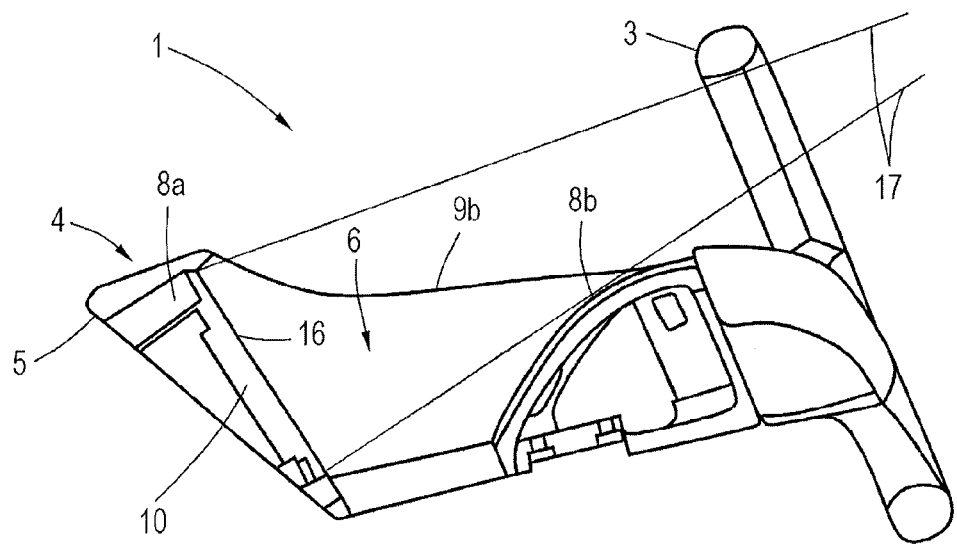
FIG. 3 shows a sectioned view of a schematic illustration of a steering wheel arrangement in accordance with another illustrative embodiment.

FIG. 3 shows a sectioned view of a schematic illustration of a steering wheel arrangement 1 in accordance with another illustrative embodiment. As is apparent, an indicating means 10 in the form of a display is arranged in an recess in that wall 8a of the housing body 5 of the steering column 4 which is remote from the steering wheel 3 and extends transversely to the longitudinal center axis 7. Here, the indicating surface 16 of the indicating means 10 faces into the recess 6. The arrangement of the indicating means 10 is such that the indicating surface 16 is visible or perceptible through the recess 6 (cf. the field of view of the driver onto the indicating surface 16 through the steering wheel 3, said field of view being indicated by the lines 17).

The maximum possible indicating surface 16 of the indicating means 10 is determined substantially by the dimensions of wall 8a. In particular, it is thus possible to provide the steering column 4 itself with a corresponding indicating means 10.

Figure 4:
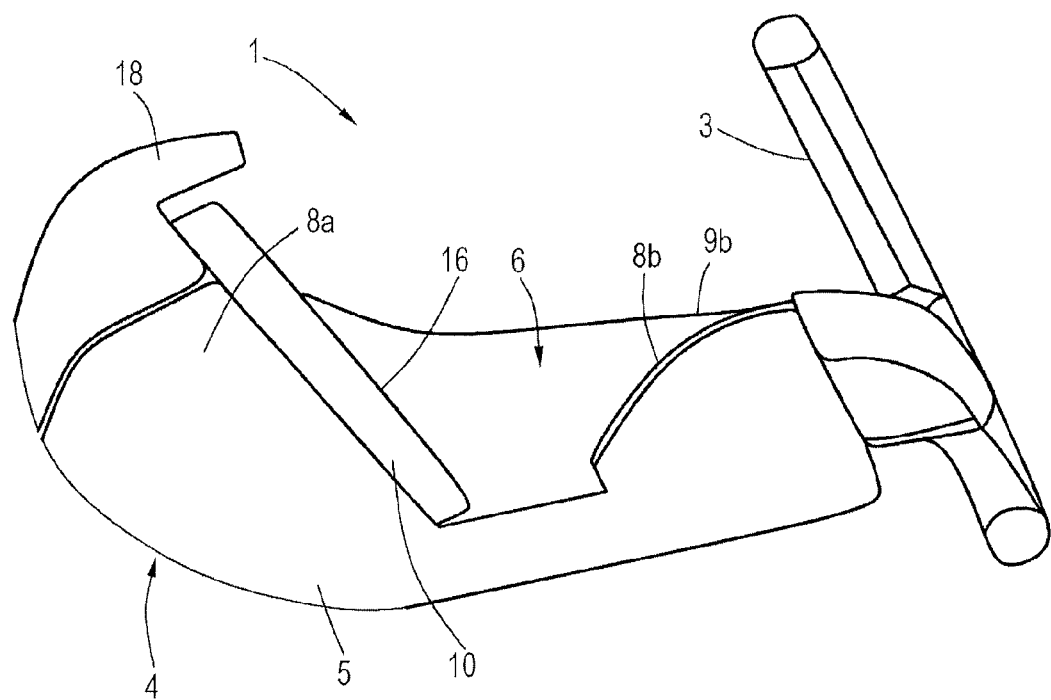
FIG. 4 shows a sectioned view of a schematic illustration of a steering wheel arrangement in accordance with another illustrative embodiment.

As is evident from FIG. 4, it is also conceivable that just one, in particular lower, part of the indicating means 10 or of the indicating surface 16 thereof is arranged on wall 8a of the housing body 5, wherein an upper part of the indicating means 10 or of the indicating surface 16 thereof extend substantially in a vertical direction into an instrument panel bounded by a cover 18 forming part of a dashboard. This makes it possible to use an indicating means 10 which is significantly larger as regards the indicating surface 16 thereof than conventional indicating means 10 installed in instrument panels. An appropriate arrangement of an indicating means 10 at least partially within the housing body 5 of the steering column 4 offers advantages in terms of ergonomics and of safety engineering since, on the one hand, it is possible for the driver to glance in a particularly ergonomic manner at the indicating surface 16 of the indicating means 10 or the content shown there. On the other hand, it is possible for the driver to turn his attention particularly quickly from the content shown on the indicating surface 16 of the indicating means 10 to the current traffic situation.

Figure 5:
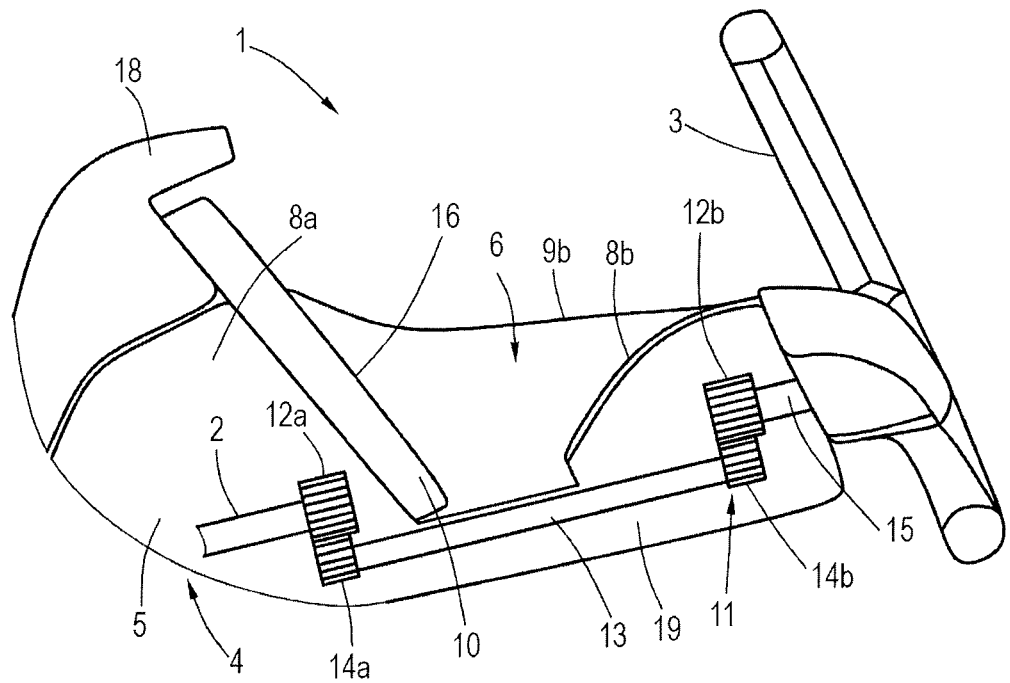
FIG. 5 shows a sectioned view of a schematic illustration of a steering wheel arrangement in accordance with another illustrative embodiment.

FIG. 5 shows a sectioned view of a schematic illustration of a steering wheel arrangement 1 in accordance with another illustrative embodiment. FIG. 5 is intended to illustrate both the construction and functional aspects of the mechanical coupling of the steering wheel 3 to a steering shaft 2 connected to a steerable axle of the motor vehicle. As is evident, an angle gear 11 that transmits rotary movements of the steering wheel 3 is inserted between the steering wheel 3 and the steering shaft 2 in the region of the steering column 4, i.e. within the housing body 5 belonging to the steering column 4.

The angle gear 11 has at least two gear elements arranged adjacent to the recess 6 in the housing body 5 of the steering column 4, i.e. in the region of the walls 8a, 8b, and designed as gearwheels 12a, 12b. As is evident, the gear wheels 12a, 12b are coupled motionally to one another by a gear shaft 13. For this purpose, the gear shaft 13 has, at the respective ends thereof, corresponding gear elements in the form of gearwheels 14a, 14b that mesh with gearwheels 12a, 12b. Rotary movements of the steering wheel 3 are thus transmitted via a shaft-type gear element 15, which is connected to the steering wheel 3 for conjoint rotation and is, in turn, connected to gearwheel 12a for conjoint rotation, via the mechanical coupling of gearwheels 12b, 14b to the gear shaft 13 and, via the mechanical coupling of gearwheels 14a, 12a, to the steering shaft 2, which is connected to gearwheel 12a for conjoint rotation. As is evident, the gear shaft 13 extends below an imaginary extension of the steering shaft 2 in the longitudinal direction, in a corresponding hole in a horizontal wall 19 that connects walls 8a, 8b.

Figure 6:
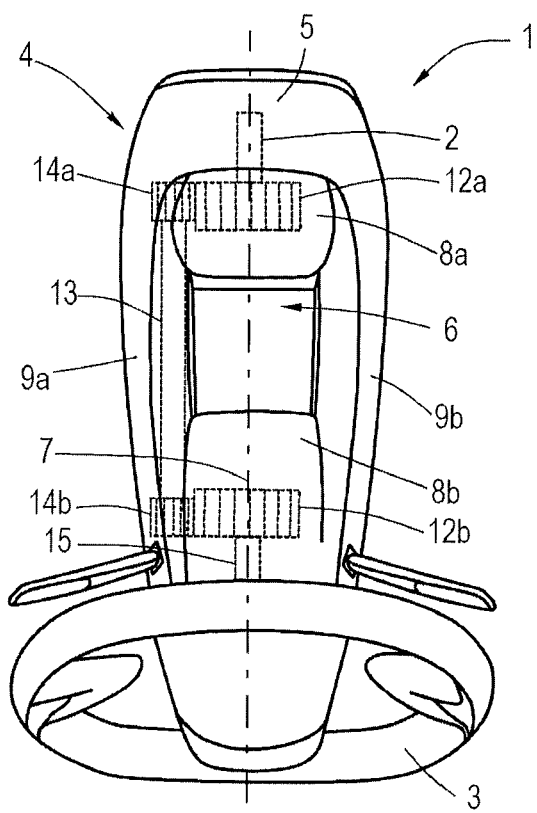
FIG. 6 shows a plan view of a schematic illustration of a steering wheel arrangement in accordance with another illustrative embodiment.

In contrast to FIG. 5, FIG. 6 shows an embodiment in which the gear shaft 13 is arranged in a corresponding hole provided for this purpose in a side wall 9a of the housing body 5 of the steering column 4, said side wall forming a lateral boundary of the recess 6. Consequently, the gear shaft 13 is routed along the side of the recess 6. Of course, the gear shaft 13 or an additional gear shaft 13 could also be routed along the right-hand side of the recess 6, i.e. within side wall 9b.

The principle of operation of the angle gear 11 corresponds to the angle gear 11 shown in FIG. 5. All the gear elements of the angle gear 11 and the steering shaft 2 are shown in dashed lines since they are located within the housing body 5 of the steering shaft 4.

As an alternative to the purely mechanical motional coupling of the steering wheel 3 to the steering shaft 2, as described and shown in FIGS. 5 and 6, it is also possible for the motional coupling between the steering wheel 3 and the steerable axle of the motor vehicle to be accomplished electronically by a control unit (not shown) in accordance with what is known as the "steer-by-wire" principle. In this case, steering signals are produced by a sensor system (not shown) which senses rotary movements of the steering wheel 3, said signals being transmitted to an actuator designed to carry out steering movements of the steerable axle of the motor vehicle and being converted there into corresponding steering movements.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A steering wheel device for a motor vehicle, comprising:
    a steering column having a housing body;
    a steering wheel motionally coupled to a steerable axle of the motor vehicle by a steering shaft, the steering wheel being arranged rotatably on the steering column such that the steering wheel has an axis of rotation that defines a longitudinal center axis of the housing body; and
    an upwardly open recess formed in the housing body, the recess being bounded at least by two opposite walls extending transversely to the longitudinal center axis of the housing body, the recess having a depth extending to or beyond the longitudinal center axis of the housing body.

2. The steering wheel device as claimed in claim 1, wherein the recess also bounded by at least two side walls of the housing body which extend parallel to the longitudinal center axis of the housing body.

3. The steering wheel device as claimed in claim 1, wherein the recess is a through opening that fully penetrates the housing body.

4. The steering wheel device as claimed in claim 1, wherein at least one of the walls extending transversely to the longitudinal center axis extends obliquely relative to a vertical plane.

5. The steering wheel device as claimed in claim 4, wherein the walls extending transversely to the longitudinal center axis both slope inward to the recess such that the recess has a width that increases away from a floor of the motor vehicle.

6. The steering wheel device as claimed in claim 1, wherein the walls extending transversely to the longitudinal center axis comprise a wall proximate to the steering wheel and a wall remote from the steering wheel, and
    an indicator element is provided in or on the wall remote from the steering wheel.

7. The steering wheel device as claimed in claim 6, wherein a first portion of the indicator element is provided on the wall remote from the steering wheel, and
    a second portion of the indicator element is provided on an instrument panel of the motor vehicle.

8. The steering wheel device as claimed in claim 1, wherein at least one angle gear that transmits rotary movements of the steering wheel, is inserted between the steering wheel and the steering shaft in the steering column.

9. The steering wheel device as claimed in claim 8, wherein the angle gear comprises:
    at least two gearwheels arranged adjacent to the recess; and
    a gear shaft that connects and motionally couples the gearwheels to one another.

10. The steering wheel device as claimed in claim 9, wherein
    the housing body has a side wall which extends parallel to the longitudinal center axis of the housing body and which serves as a lateral boundary to the recess, and
    the gear shaft is arranged in a hole in the side wall.

11. The steering wheel device as claimed in claim 9, wherein
    the housing body has a side wall which extends parallel to the longitudinal center axis of the housing body and which serves as a lateral boundary to the recess,
    the housing body has an outer casing, and
    the gear shaft is arranged between the side wall and the outer casing of the housing body.

12. The steering wheel device as claimed in claim 1, wherein
- a control unit motionally couples the steering wheel to the steerable axle,
- the control unit has a sensor system that senses rotary movements of the steering wheel, and
- the control unit communicates information relating to the rotary movements, to an actuator that performs steering movements of the steerable axle.

13. A motor vehicle comprising a steering wheel device as claimed in claim 1.

* * * * *

UNITED STATES PATENT AND TRADEMARK OFFICE
CERTIFICATE OF CORRECTION

PATENT NO.        : 9,016,723 B2
APPLICATION NO.   : 14/342075
DATED             : April 28, 2015
INVENTOR(S)       : Peter Zeinar et al.

Page 1 of 1

It is certified that error appears in the above-identified patent and that said Letters Patent is hereby corrected as shown below:

In the Claims

Column 8, Line 19, In Claim 2, after "recess" insert -- is --.

Signed and Sealed this
Eighteenth Day of August, 2015

Michelle K. Lee
*Director of the United States Patent and Trademark Office*